United States Patent
Perot et al.

(10) Patent No.: US 11,040,893 B2
(45) Date of Patent: Jun. 22, 2021

(54) DEPOLLUTION OF WATER IN ACTIVATED CARBON FLUIDIZED BED USING NECESSARY AND SUFFICIENT VOLUME OF GRANULAR ACTIVATED CARBON DETERMINED BASED ON UV MEASUREMENTS

(71) Applicant: Saur, Issy les Moulineaux (FR)

(72) Inventors: Jean Perot, Elancourt (FR); Yves Coquet, Voisins le Bretonneux (FR)

(73) Assignee: Saur

( * ) Notice: Subject to any disclaimer, the term of this patent is extended or adjusted under 35 U.S.C. 154(b) by 95 days.

(21) Appl. No.: 15/766,446

(22) PCT Filed: Oct. 10, 2016

(86) PCT No.: PCT/EP2016/074247
§ 371 (c)(1),
(2) Date: Apr. 6, 2018

(87) PCT Pub. No.: WO2017/060536
PCT Pub. Date: Apr. 13, 2017

(65) Prior Publication Data
US 2018/0312411 A1    Nov. 1, 2018

(30) Foreign Application Priority Data
Oct. 8, 2015  (EP) .................................... 15306586

(51) Int. Cl.
*C02F 1/28*    (2006.01)
*B01J 20/20*   (2006.01)
(Continued)

(52) U.S. Cl.
CPC ............... *C02F 1/283* (2013.01); *B01J 20/20* (2013.01); *B01J 20/28004* (2013.01);
(Continued)

(58) Field of Classification Search
None
See application file for complete search history.

(56) References Cited

U.S. PATENT DOCUMENTS 5,997,812 A * 12/1999 Burnham .................. A23L 2/50
                                                          210/695
2002/0027109 A1 * 3/2002 Conrad ..................... C02F 1/78
                                                          210/760
(Continued)

FOREIGN PATENT DOCUMENTS

FR    2874913 A1   3/2006
FR    3009789 A1   2/2015

OTHER PUBLICATIONS

International Search Report for PCT/EP2016/074247 dated Nov. 28, 2016.

*Primary Examiner* — Hayden Brewster
(74) *Attorney, Agent, or Firm* — Lerner, David, Littenberg, Krumholz & Mentlik, LLP

(57) ABSTRACT

The present invention relates to a method for removing pollution from water containing organic micropollutants by adsorption on granular activated carbon in a treatment reactor (1) having rising flow and an expanded bed, so as to reduce a previously set percentage of micropollutants, making it possible to specifically determine the weight or the volume of granular activated carbon which is optimal (necessary and sufficient) in the reactor in order to obtain said previously set reduction percentage of organic micropollutants.

17 Claims, 5 Drawing Sheets

(51) Int. Cl.
 *B01J 20/28* (2006.01)
 *C02F 1/00* (2006.01)
 *C02F 101/30* (2006.01)

(52) U.S. Cl.
 CPC ......... *B01J 20/28016* (2013.01); *C02F 1/008* (2013.01); *C02F 2101/30* (2013.01); *C02F 2101/305* (2013.01); *C02F 2101/306* (2013.01)

(56) References Cited

U.S. PATENT DOCUMENTS

| | | | |
|---|---|---|---|
| 2002/0104787 A1* | 8/2002 | Murayama | B01D 61/16 210/94 |
| 2012/0080385 A1* | 4/2012 | Perot | C02F 1/283 210/723 |
| 2015/0336810 A1* | 11/2015 | Smetona | C02F 1/325 210/96.1 |

* cited by examiner

DEPOLLUTION OF WATER IN ACTIVATED CARBON FLUIDIZED BED USING NECESSARY AND SUFFICIENT VOLUME OF GRANULAR ACTIVATED CARBON DETERMINED BASED ON UV MEASUREMENTS

CROSS REFERENCE TO RELATED APPLICATIONS

The present application is a national phase entry under 35 U.S.C. § 371 of International Application No. PCT/EP2016/074247 filed on Oct. 10, 2016, which claims priority from European Patent Application No. 15306586.7 filed on Oct. 8, 2015, all of which are hereby incorporated herein by reference.

FIELD OF THE INVENTION

This invention concerns the field of water treatment, more particularly waste water, such as urban and industrial waste water. More particularly, this invention concerns a method for decontaminating water by adsorption onto granular activated carbon in a treatment reactor with upward flow and an expanded bed.

PRIOR ART

At present, equipment and analytical methods are sufficiently developed to detect in water the molecules resulting from human activity, such as pesticides, herbicides, drug products, etc. These molecules are generically referred to by the terms "emergent products" or "micropollutants".

Methods have been developed to eliminate these micropollutants from water. Especially, it has been proposed to eliminate these micropollutants on powdered activated carbon (PAC) (3 µm<particle size<100 µm) or in grains (GAC) (100 µm<particle size<1000 µm). The activated carbon allows the elimination of many organic micropollutants and many organic materials by adsorption.

The elimination of micropollutants by adsorption onto granular activated carbon can be performed within a treatment reactor as described in patent FR2874913, preferably intended for the treatment of subterranean and surface water with light organic pollution.

In recent years, the treatment of waste water has been the subject of especial interest. This is because treated water discharged into the natural environment must meet ever stricter regulatory requirements. In particular, checks must be made to ensure that micropollutants are not present above certain thresholds.

Discharge from purification plants also affects the quality of the resource for the production of potable water. It is therefore important to monitor the quality of water to be treated to potable quality.

In general, waste water is divided into two categories: urban water and industrial water coming, for example, from the chemical and pharmaceutical industries. In the interests of satisfying the regulatory requirements, it has been proposed to eliminate micropollutants from waste water using methods of adsorption onto activated carbon, particularly granular activated carbon, as described in patent FR2874913. Water to be treated to potable quality constitute a third category of waster in which treatments by adsorption onto activated carbon are also very suitable.

In the methods of treatment by adsorption onto activated carbon, the quantity of activated carbon to be injected into the reactors depends on the concentration of micropollutants to be treated. In the interests of reducing the cost of water treatment associated with the use of granular activated carbon, it is important that the volume or mass of granular activated carbon used in the treatment reactor be optimal to obtain an efficient percentage of reduction of organic micropollutants from the water.

A method for checking and/or monitoring the reduction of micropollutants in the water in order to regulate the concentrations of activated carbon necessary for the elimination of the micropollutants in the waste water is particularly described in the patent application FR3009789. However, this method does not make it possible to determine the volume or mass that is optimal, i.e. necessary and sufficient in GAC, to obtain a previously—set percentage of reduction of the micropollutants.

Consequently, there was a need to develop a method for decontaminating water containing organic micropollutants by adsorption onto granular activated carbon in a treatment reactor, in such a way as to reduce a previously—set percentage of micropollutants, making it possible to specifically determine the optimal (necessary and sufficient) mass or volume of granular activated carbon in the reactor to obtain said previously—set percentage of reduction of the organic micropollutants.

SUMMARY OF THE INVENTION

This invention concerns a method for decontaminating water, typically waste water, containing organic micropollutants by adsorption onto granular activated carbon in a treatment reactor with upward flow and an expanded bed, in such a way as to reduce a previously—set percentage of micropollutants, said method comprising at least the following steps:

1) on the basis of said previously—set percentage reduction of micropollutants (% $MP_f$), determination of the rate (Tx) of treatment with granular activated carbon to be injected into said reactor, then starting of the treatment reactor by injection of the water and treatment by adsorption of the micropollutants onto granular activated carbon at said treatment rate, and 2) check by UV of the performance of the treatment by adsorption onto granular activated carbon at the previously—set treatment rate (Tx) in order to determine the mass or volume of granular activated carbon that is necessary and sufficient in the reactor to obtain said % $MP_f$.

DEFINITIONS

Figure 1:
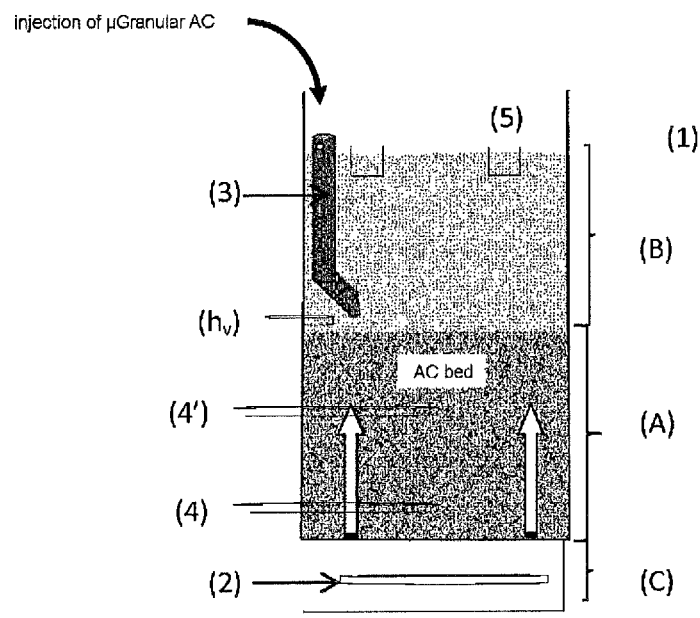
FIG. 1 represents a particular embodiment of the treatment reactor used in the decontamination method according to the present invention.

The term "micropollutants" as used in the description of the present invention refers to micropollutants which can be chosen from among alkylphenols, pharmaceutical substances for human or animal use, polycyclic aromatic hydrocarbons, pesticides, herbicides, insecticides, phthalates, adsorbable organic halogens, organotin compounds, phenols and combinations thereof. In particular, the micropollutants are chosen from among pesticides, herbicides, phthalates, pharmaceutical substances and combinations thereof. In particular, the term "micropollutant(s)" can refer specifically to pharmaceutical substances, especially pharmaceutical substances chosen from among carbamazepine, oxazepam, diclofenac, ibuprofen, ketoprofen, furosemide, atanolol, propanolol, sulfamethoxazole and benzotriazole.

The expression "decontaminated water" refers to the condition of the water after coming into contact with a bed of granular activated carbon.

The expression "decontaminated and settled water" refers to the condition of the water after treatment according to the present invention.

The term "water" as used in the description of the present invention refers to waste water or water to be treated to potable quality.

The term "treatment rate" as used in the present invention refers to the mass of activated carbon (in grams) added to the volume of water to be treated (in $m^3$).

EXPLANATION OF THE INVENTION

The Applicant has developed a method for decontaminating water, typically waste water, containing organic micropollutants by adsorption onto granular activated carbon in a treatment reactor with upward flow, which makes it possible to optimize the mass or volume of granular activated carbon in the reactor, for a given treatment rate, and thus to dimension the reactor. More particularly, the method makes it possible to determine the optimal mass or volume of granular activated carbon in the reactor that is necessary and sufficient to obtain a previously—set percentage of reduction of organic micropollutants. (% Mp).

Thus, the present invention concerns a method for decontaminating water, typically waste water, containing organic micropollutants by adsorption onto granular activated carbon in a treatment reactor with upward flow, in such a way as to reduce a previously—set percentage of micropollutants, comprising the injection of the water into the lower part of the reactor containing a bed of activated carbon in such a way as to create an expansion of said activated carbon while simultaneously ensuring the gravitational separation of the decontaminated water from the activated carbon particles and the retrieval by overflow of the decontaminated and settled water in the upper part of the reactor, said method comprising at least the following steps:

1) on the basis of said previously—set percentage of reduction of micropollutants (% $MP_f$), determination of the rate (Tx) of treatment with granular activated carbon to be injected into said reactor, then starting of the treatment reactor by injection of the water and treatment by adsorption of the micropollutants onto granular activated carbon at said treatment rate, and 2) check by UV of the performance of the treatment by adsorption onto granular activated carbon at the previously defined treatment rate (Tx) in order to determine the mass or volume of granular activated carbon that is necessary and sufficient in the reactor to obtain said % $MP_f$.

The checking of the performance of the treatment by adsorption onto granular activated carbon advantageously comprises the following steps:

(1) measuring the absorbency at a given wavelength λ of the water before treatment by adsorption onto granular activated carbon ($A_{\lambda AvTx}$);

(2) measuring the absorbency at the same wavelength λ of the water after treatment by adsorption onto granular activated carbon ($A_{\lambda ApTx}$); and (3) calculating the UV reduction yield (% $UV_c$) on the basis of the absorbencies measured before and after treatment (% $UV_c=((A_{\lambda AvTx}-A_{\lambda ApTx})/A_{\lambda AvTx})*100$).

The steps (1), (2), and (3) for checking the UV reduction yield (% $UV_c$) are advantageously repeated over time. Advantageously, the checking of the reduction yield $UV_c$ is carried out continuously and regularly. When the check is made regularly, it is advantageously made at least once a day.

Advantageously, the present invention concerns a method for decontaminating water, typically waste water, containing organic micropollutants by adsorption onto granular activated carbon in a treatment reactor with upward flow, in such a way as to reduce a previously—set percentage of micropollutants, comprising the injection of the water into the lower part of the reactor containing a bed of activated carbon in such a way as to create an expansion of said activated carbon while simultaneously ensuring the gravitational separation of the decontaminated water from the activated carbon particles and the retrieval by overflow of the decontaminated and settled water in the upper part of the reactor, said method comprising at least the following steps:

1') determination of the UV reduction yield (% $UV_f$) on the basis of said previously—set percentage of reduction of micropollutants (% $MP_f$), using the relationship % MP=f (% UV) (see in particular FIG. 2), said relationship being previously determined for said water, 2') determination of the rate (Tx) of treatment with granular activated carbon to be injected into said reactor on the basis of the UV reduction yield (% $UV_f$), using the relationship % UV=f(Tx) (see in particular FIG. 4), said relationship being previously determined for said water, then starting of the treatment reactor by injection of the water and treatment by adsorption of the micropollutants onto granular activated carbon at said treatment rate, and 3') check by UV of the performance of the treatment by adsorption onto granular activated carbon at the previously defined treatment rate (Tx) as per the following steps:

(1) measuring the absorbency at a given wavelength λ of the water before treatment by adsorption onto granular activated carbon ($A_{\lambda AvTx}$);

(2) measuring the absorbency at the same wavelength λ of the water after treatment by adsorption onto granular activated carbon ($A_{\lambda ApTx}$); and (3) calculating the UV reduction yield (% $UV_c$) on the basis of the absorbencies measured before and after treatment (% $UV_c=((A_{\lambda AvTx}-A_{\lambda ApTx})/A_{\lambda AvTx})*100$) and determination of the mass or volume of granular activated carbon necessary and sufficient in the reactor to obtain said % $UV_f$ (which was set in step 1')).

Figure 3:
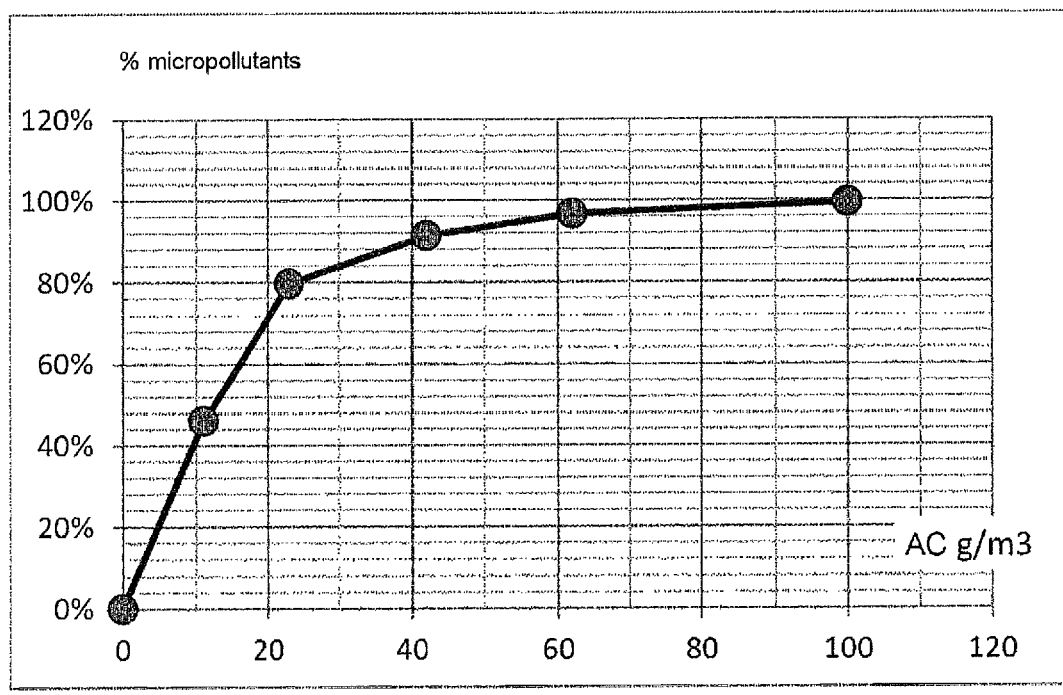
FIG. 3 is a graph representing the percentage of reduction of micropollutants as a function of the carbon treatment rate applied.

According to another embodiment, said rate (Tx) of treatment with granular activated carbon to be injected into the reactor determined in step 2') is determined on the basis of said previously—set percentage of reduction of micropollutants (% $MP_f$), using the relationship % MP=f(Tx) (see in particular FIG. 3), said relationship being previously determined for said water. In this case, steps 1') and 3') are carried out as explained above.

According to another embodiment, said rate (Tx) of treatment with granular activated carbon to be injected into the reactor determined in step 2') is determined on the basis of said previously—set percentage of reduction of micropollutants (% $MP_f$), using the relationship % MP=f(Tx) (FIG. 3), and on the basis of the UV reduction yield (% $UV_f$), using the relationship % UV=f(Tx) (FIG. 4), said relationships being previously determined for said water. In this case, steps 1') and 3') are performed as explained above.

Advantageously, the set percentage of reduction of micropollutants (% Mp) is between 50 and 100% for urban water.

Advantageously according to the invention, the previously—set percentage of reduction of micropollutants (% $MP_f$) makes it possible first to determine the UV reduction yield (% $UV_f$), using the relationship % MP=f (% UV) (FIG. 2), said relationship being previously determined for said water.

Figure 4:
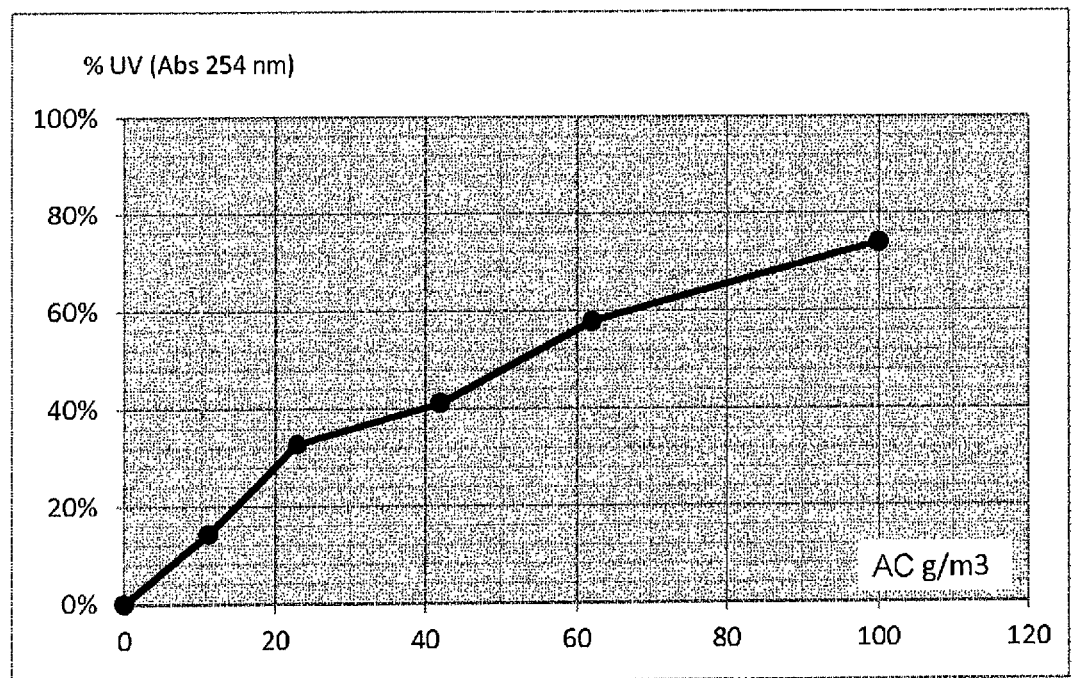
FIG. 4 is a graph representing the percentage of reduction of UV as a function of the carbon treatment rate applied.

The relationship % Mp=f (% UV) making it possible to determine the UV reduction yield (% $UV_f$) on the basis of said % $MP_f$, is advantageously determined as follows:
(i) taking samples of said water;
(ii) selecting one or more organic micropollutants to be quantified in said samples;
(iii) measuring the effective concentration of the organic micropollutant(s) selected in step (ii) in said samples and measuring the absorbency of said samples at a given wavelength λ;
(iv) treating said samples by putting them in contact with increasing doses of granular activated carbon;
(v) measuring, for each dose of activated carbon tested, the effective concentration of the organic micropollutant(s) selected in step (ii) in said samples after treatment as per step (iv);
(vi) measuring, for each dose of activated carbon tested, the absorbency of said samples after treatment as per step (iv) at a given wavelength λ;
(vii) determining, for each dose of activated carbon tested, the percentage of reduction of micropollutants (% MP) and the UV reduction yield (% UV) to thus obtain the relationships % MP=f(Tx) (FIG. 3) and % UV=f(Tx) (FIG. 4);
(viii) determining the equation of the relationship % MP=f (% UV) (FIG. 2), expressing the percentage of reduction of micropollutants (% MP) as a function of the UV reduction yield (% UV). The measurement of the absorbency of the samples before and after decontamination by adsorption onto activated carbon as per steps (iii) and (vi) is typically carried out by means of a spectrophotometer.

Thus, the checking of the performance of the treatment by adsorption onto granular activated carbon corresponds to the checking of the UV reduction yield. This check therefore makes it possible to verify that the UV reduction value calculated during the check (% $UV_c$) does indeed correspond to the UV reduction yield (% $UV_f$) determined on the basis of the previously—set percentage of reduction of micropollutants (% $MP_f$) and according to the relationship % MP=f (% UV) determined previously.

The treatment of the samples as per step (iv) is carried out by putting the samples in contact with increasing doses of activated carbon. In general, at least four doses of activated carbon are tested. The contact time can vary from 15 to 120 minutes, preferably 60 minutes. During the contact time, the samples are advantageously stirred.

The measurement of the effective concentrations of the micropollutants as per steps (iii) and (v) is performed using methods well known to those skilled in the art. Thus, the effective concentrations of the micropollutant(s) selected can be determined by liquid-phase or gas—phase chromatography.

Figure 2:
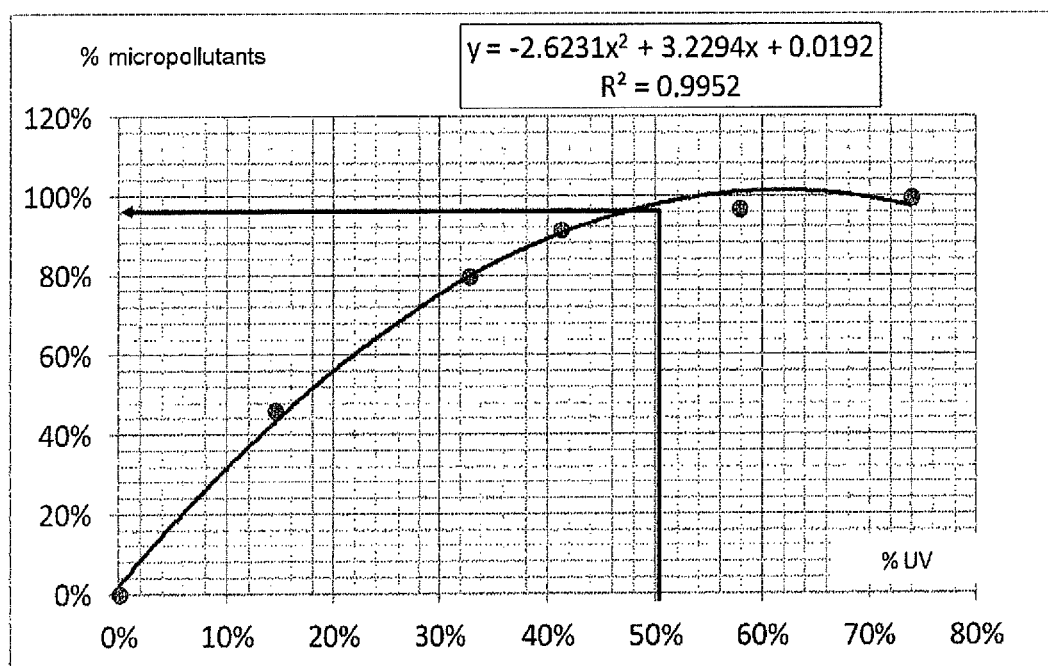
FIG. 2 is a graph representing the percentage of reduction of micropollutants in water as a function of the UV reduction yield by the treatment by adsorption onto granular activated carbon.

The percentages of reduction of the micropollutants (% $Mp_{dose1}$, % $Mp_{dose2}$, % $Mp_{dose3}$) and the UV reduction yields (% $UV_{dose1}$, % $UV_{dose2}$, % $UV_{dose3}$) as a function of the doses of granular activated carbon (dose 1, dose 2, dose 3) are determined by simple calculation. The values obtained can be represented on a graph with on the abscissa the UV reduction yield and on the ordinate the percentage of reduction of the micropollutants ((% $UV_{dose1}$, % $Mp_{dose1}$), (% $UV_{dose2}$, % $Mp_{dose2}$), ((% $UV_{dose3}$, % $Mp_{dose3}$) etc). The graph eventually makes it possible to determine the equation of the relationship expressing the percentage of reduction of micropollutants (% Mp) as a function of the UV reduction yield (% UV) (FIG. 2).

Checking of the Performance

When the water is industrial waste water, for example resulting from chemical or pharmaceutical industries, step (ii) described above typically comprises the selection of the organic micropollutant(s) that the treatment by adsorption onto activated carbon specifically aims to eliminate. This is because the nature of the micropollutant(s) liable to be contained in industrial waste water is very often known, thus making it easy to check and/or monitor this (these) micropollutant(s).

Moreover, when the water is industrial waste water, the decontamination by adsorption onto activated carbon to which reference is made in steps 1) and 2) or 2') and 3') can be carried out upstream or downstream of a facility for the biological treatment of the waste water. Thus, in the method according to the invention, the waste water can be industrial waste water previously decontaminated, or not decontaminated, by biological treatment.

When the waste water is urban waste water, the micropollutants liable to be contained in the waste water are varied in nature. However, it has been shown that urban waste water recurrently contains micropollutants such as carbamazepine, oxazepam, diclofenac, ibuprofen, ketoprofen, furosemide, atanolol, propanolol, sulfamethoxazole and benzotriazole. Thus, when the waste water is urban waste water, step (ii) described above comprises the selection of these micropollutants and steps (iii) and (v) comprise the measurement of the total effective concentration of these micropollutants. Micropollutants other than those previously listed can furthermore be quantified.

Given that a part of the water to be treated to potable quality comes from discharge from urban or industrial purification plants, the micropollutants recurrently found in this waste water are also found in the water to be treated to potable quality.

The method according to the invention is especially suitable for the decontamination of water containing organic micropollutants such as carbamazepine, oxazepam, diclofenac, ibuprofen, ketoprofen, furosemide, atanolol, propanolol, sulfamethoxazole and benzotriazole.

Advantageously, the measurements of absorbencies before treatment ($A_{\lambda AvTx}$) and after treatment ($A_{\lambda ApTx}$) of the water in the treatment reactor (steps (1) and (2) or (2') and 3')) can be measured by means of UV or photometer sensors as described in patent application 1-R3009789.

Advantageously, the rate (Tx) of treatment with granular activated carbon to be injected into the reactor is determined using the relationships % MP=f(Tx) and/or % UV=f(Tx), said relationships being obtained from steps (i) to (vii) previously mentioned.

The wavelength $\lambda$ is preferably chosen in the ultraviolet domain (200-380 nm), preferably 200 to 300 nm. Specifically, the absorbency can be measured at 254 nm.

Typically, the rate of treatment with granular activated carbon is a usual rate set for urban waste water, the rate being between 5 and 30 g/m$^3$, advantageously between 10 and 25 g/m$^3$. For industrial waste water, the rate is generally determined by way of the relationships % MP=f(Tx) (FIG. 3) and % UV=f(Tx) (FIG. 4), and is typically between 50 and 1000 g/m$^3$.

Once the rate of treatment with activated carbon (Tx) to be applied in the treatment reactor to obtain the set percentage of reduction of micropollutants (% MP$_f$) is set or determined advantageously from the relationships % Mp=f (% UV) and % UV=f(Tx), the reactor is started by injection of water at an upward velocity between 7 and 20 m$^3$/m$^2$·h, advantageously between 12 and 15 m$^3$/m$^2$·h, in such a way as to obtain a dense suspension of activated carbon in a treatment reactor with upward flow and expanded bed surmounted by a height of settled clear water.

According to a first particular embodiment, the treatment reactor is initially empty. In this case, the determination of said mass or said volume of granular activated carbon that is necessary and sufficient in the reactor to obtain said previously—set % MP$_f$, comprises at least the following steps:
  a) daily injection of granular activated carbon at the previously defined treatment rate (Tx) into the initially empty treatment reactor, then
  b) check (continuous or regular), advantageously at least once a day, of the reduction yield UV$_c$ (% UV$_c$), and
  c) obtainment of the volume of granular activated carbon that is necessary and sufficient when said % UV$_c$ is such that: % UV$_c$=% UV$_f$±20% (% UV$_f$), advantageously % UV$_c$=% UV$_f$±10% (% UV$_f$), for at least 5 days, advantageously 5 to 10 days, and extraction of granular activated carbon expanded in such a way as to preserve said necessary and sufficient volume of granular activated carbon in the reactor.

Figure 5:
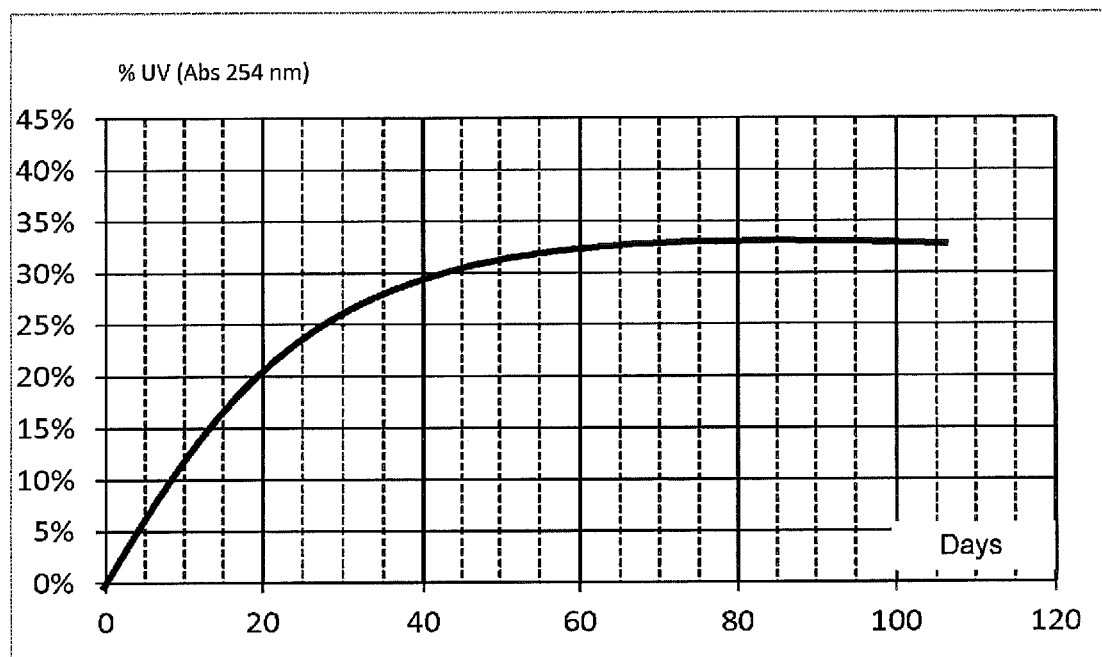
FIG. 5 is a graph representing the percentage of reduction of UV as a function of time according to a particular first embodiment (reactor initially empty).

The daily injection of granular activated carbon into the reactor makes it possible to increase the quantity of activated carbon present in the latter in order to approach the mass or volume that is necessary and sufficient to obtain the previously—set percentage of reduction of organic micropollutants (% Mp) (FIG. 5).

Thus, when the % UV$_c$ has almost ceased to vary over time (such as % UV$_c$=% UV$_f$±20% (% UV$_f$) during at least 5 days, advantageously 5 to 10 days), the rating of the treatment reactor is considered as being stabilized and the mass or volume of granular activated carbon present in the reactor is necessary and sufficient (optimal) to obtain said % MP$_f$ (FIG. 5). In order to preserve said necessary and sufficient mass or volume, an extraction of granular activated carbon is performed corresponding to the quantity of granular activated carbon injected daily. The injection and extraction thus ensure the renewal of the granular activated carbon.

Advantageously, the daily injection of granular activated carbon into the treatment reactor is carried out in one injection or in several injections a day.

Advantageously, the extraction makes it possible to extract the granular activated carbon from the moment when the mass or volume of granular activated carbon necessary and sufficient to obtain said % MP$_f$ has been obtained. Advantageously, the extraction is carried out 1 to 7 times a week.

According to a second particular embodiment, the reactor contains an initial load of granular activated carbon in such a way as to obtain at least the previously—set percentage of reduction of micropollutants (% MP$_f$) from the starting of the reactor. In this case, the determination of said mass or volume of granular activated carbon necessary and sufficient in the reactor to obtain said previously—set % MP$_f$ comprises at least the following steps:
  a') prior to the starting of the treatment reactor, introduction of an initial load of granular activated carbon into the reactor, said load accounting for a carbon bed height between 20 and 50 cm, advantageously 30 cm, and said load being chosen in such a way as to obtain at least the previously—set percentage of reduction of micropollutants (% MP$_f$), then
  b') check (continuous or regular), advantageously at least once a day, of the reduction yield UV$_c$ (% UV$_c$),
  c') when said % UV$_c$ is such that: % UV$_f$≤% UV$_c$≤% UV$_f$+15, daily injection of granular activated carbon into the reactor then
  d') check of the reduction yield UV$_c$ (% UV$_c$) until obtainment of the necessary and sufficient volume of granular activated carbon when said % UV$_c$ is such that: % UV$_c$=% UV$_f$±20% (% UV$_f$) for at least 5 days, advantageously 5 to 10 days, and extraction of granular activated carbon expanded in such a manner as to preserve said necessary and sufficient volume of granular activated carbon in the reactor.

Figure 6:
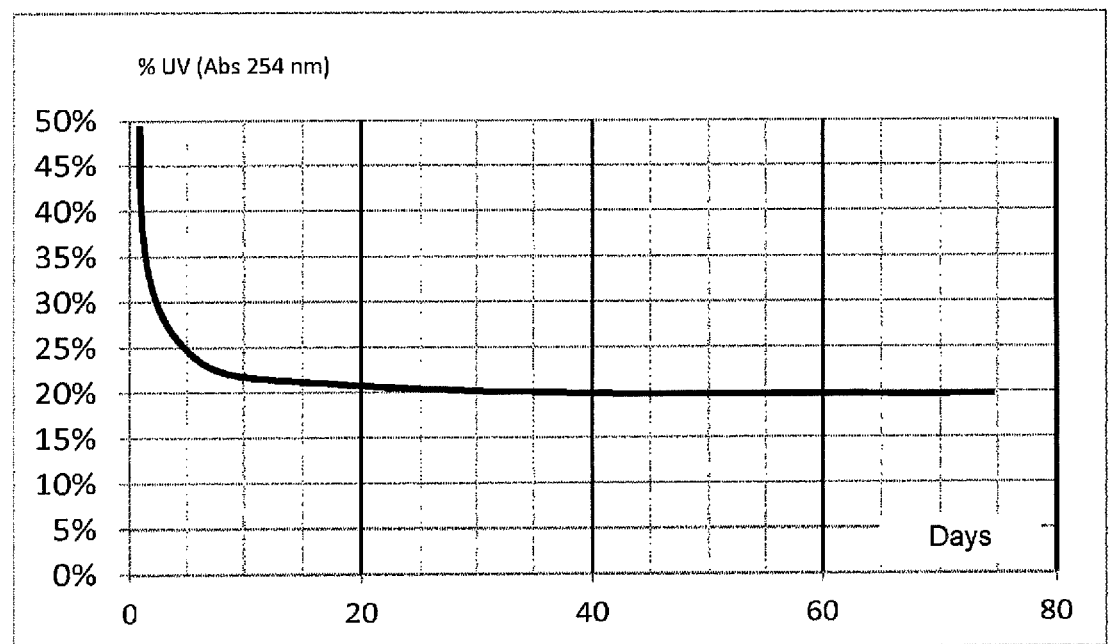
FIG. 6 is a graph representing the percentage of reduction of UV as a function of time according to a particular second embodiment (reactor with an initial load).

Thus, the start of the daily injection of activated carbon into the reactor is determined by UV check and starts when the % UV$_c$ is such that: % UV$_f$≤% UV$_c$≤% UV$_f$+15%. Once the daily injection of activated carbon has begun, the UV check makes it possible to determine when the mass or volume of granular activated carbon present in the reactor is considered optimal (necessary and sufficient) to obtain said % MP$_f$. The mass or volume is considered optimal when said % UV$_c$ is such that: % UV$_c$=% UV$_f$±20% (% UV$_f$) for at least 5 days, advantageously 5 to 10 days (FIG. 6). In order to preserve said necessary and sufficient mass or volume, an extraction of granular activated carbon is made corresponding to the quantity of granular activated carbon injected daily. The injection and extraction thus ensure the renewal of the granular activated carbon. Advantageously, the rate of treatment with activated carbon injected in step c') can be increased in order to accelerate start-up.

Advantageously, the daily injection of granular activated carbon into the treatment reactor is carried out in one injection or in several injections a day.

Advantageously, the extraction makes it possible to extract the granular activated carbon from the moment when the mass or the volume of granular activated carbon necessary and sufficient to obtain said % $MP_f$ has been obtained. Advantageously, the extraction is carried out 1 to 7 times a week.

The check of the UV makes it possible to monitor the maintenance of the performance of the method according to the invention.

Figure 8:
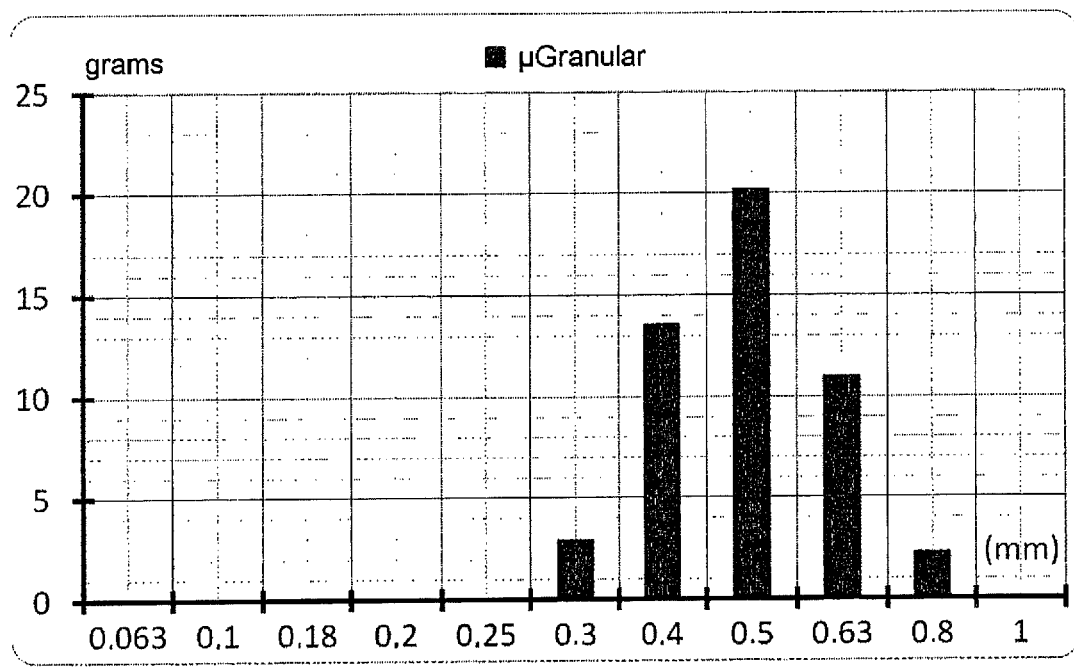
FIG. 8 is a diagram representing the distribution of the size of the granular activated carbon particles according to a particular embodiment.
Figure 9:
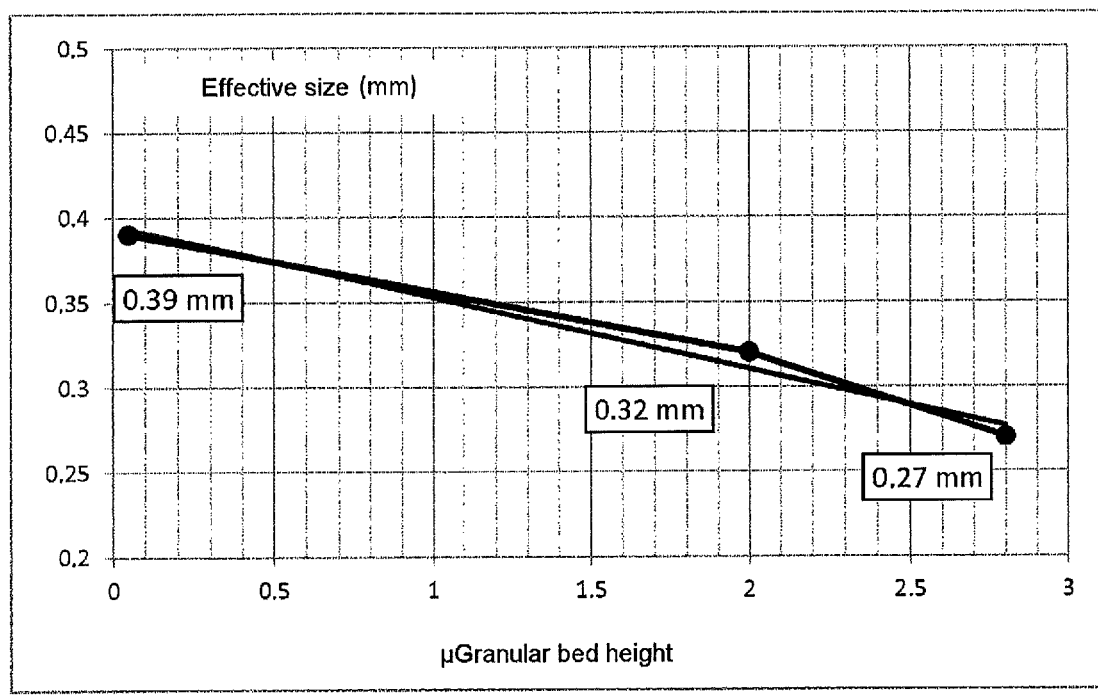
FIG. 9 represents the effective size of the granular activated carbon according to the carbon bed height.

Advantageously, the extraction of expanded granular activated carbon is carried out from at least two levels of extraction (4 and 4') (FIG. 1) from the activated carbon bed. Upon the expansion of the activated carbon, a decreasing concentration gradient, from the bottom of the reactor to the top, is generally created within the activated carbon bed. The concentration gradient varies as a function of the granulometric distribution of the activated carbon used. The settlement velocity of the grains being proportional to the particle size of the grains (between 0.3 and 1 mm) (FIG. 8), the distribution of the latter in the bed is therefore done from the larger at the bottom to the smaller at the top (FIG. 9). The time of exhaustion or saturation of the activated carbon being proportional to the diameter of the particles of the grains, it is important during the extraction to keep the larger grains for longer than the small ones. Thus, the higher the number of extraction levels over the bed height, the more optimized the extraction. Typically, an extraction is performed from at least two extraction levels of the activated carbon bed, one level being located in the upper part of the carbon bed to extract the finer grains and another level in the lower part to extract the larger grains.

Advantageously, the extraction heights are between 1.5 and 2 m, yet more advantageously at 2 m for the extraction level in the upper part of the carbon bed and between 0.1 and 1 m, even more advantageously at 0.5 m for the extraction level located in the lower part of the carbon bed.

Advantageously, the frequency of the extraction for one and the same volume is proportionally determined as a function of the effective sizes of the grain, or typically one extraction for the lower level and two for the upper level.

Advantageously, the decontamination method according to the invention comprises at least one step of washing the granular activated carbon used. Typically, the washing of the activated carbon can be carried out inside the treatment reactor, particularly by intake of air and washing water at the base of the reactor. Advantageously the circuit supplying water to be treated is used to introduce the washing water at the base of the reactor or a recirculation pump to supplement the supply flow. The washing air is injected by the same water supply circuit or with its own system of manifold and laterals.

Advantageously, the step of washing the activated carbon bed is performed when the measured height of the activated carbon bed is 20% greater than the theoretical height at stabilized rating. Typically, a theoretical height is determined for a given velocity at stabilized rating, the expansion height of the bed depending on the upward velocity. Advantageously, the measurement of the height of the activated carbon bed is carried out daily or continuously.

Advantageously, the washing is performed when $h_e \geq h_p +$ 10 to 50% ($h_p$), advantageously $h_e \geq h_p + 10$ to 20% ($h_p$), $h_e$ representing the height of the unwashed expanded bed and $h_p$ the height of the washed bed. The unwashed expanded bed corresponds to the bed containing the TSS and the washed bed corresponds to the bed without the TSS.

Advantageously, the washing step comprises an expansion phase and a settling phase.

The activated carbon bed formed by the accumulation of the doses injected has the faculty of retaining a large part of the total suspended solids (TSS) that enter in the treatment reactor. Moreover, the age of this activated carbon remaining in the reactor promotes the development of a biofilm. It is necessary to expel these TSS and this biofilm as without extraction thereof, an increase in the volume of the bed can cause a leak of TSS and/or activated carbon. The aim of this washing is to separate these TSS from the carbon without however damaging it. As carbon is a low-density material (apparent density less than 0.7), the expansion phase consists in applying to the activated carbon bed an upward velocity advantageously between 20 and 50 $m^3/m^2 \cdot h$ and more advantageously 30 $m^3/m^2 \cdot h$, allowing the separation of the activated carbon from the total suspended solids present in the water and thus a sufficient expansion of the carbon so that the TSS migrate above the bed.

Advantageously, the duration of the expansion is between 5 and 15 minutes, advantageously between 7 and 11 minutes, and advantageously said washing is performed 1 to 7 times a week, yet more advantageously 1 to 3 times a week.

Once the expansion phase of the washing step is finished, a settling phase and then a phase of draining the upper part of the carbon bed (separation zone (B)) (FIG. 1) are necessary to extract the TSS.

The settling phase makes it possible to settle the TSS and the granular activated carbon expanded during the expansion phase. According to a particular embodiment, the settling phase of the washing step can be performed with the reactor operating at a minimum upward velocity allowing an efficient settling, said velocity being advantageously less than or equal to 15 $m^3/m^2 \cdot h$ or with the reactor stopped. When the reactor is stopped, said stop has a duration between 3 and 10 min, advantageously 5 min.

Following the settling phase, a draining phase allowing the expulsion of the water column comprising the TSS is carried out, typically toward a pretreatment station and/or a bin for dewatering the carbon from a discharge valve located at a drainage height ($h_v$) (FIG. 1). Advantageously, the draining phase has a duration of between 5 and 30 minutes, advantageously between 5 and 10 minutes.

Once the draining of the water column comprising the TSS is finished, a rinsing phase is typically carried out by resuming the supply at the flow rate preceding the step of washing by injection of the water into the lower part of the treatment reactor. During the rinsing phase, the drain valve is open to allow the discharging of the entirety of the water injected into the lower part of the reactor, thus the water under no circumstances passes through the pipes by overflow. The rinsing phase advantageously has a duration between 5 and 20 minutes, advantageously between 5 and 10 minutes. Once this rinsing phase is finished, the drain valve is closed while maintaining the supply flow rate for the resumption of the treatment.

The washing makes it possible to avoid TSS entering the inside of the bed and swelling it, which can cause a sudden loss of the granular activated carbon, which can lead to a drop in the quality of the treatment. Thus, the reactor also comprises means (3) for injecting new activated carbon, and means (4 and 4') for extracting used activated carbon. The means for extracting used activated carbon are generally contained in the reaction zone (A) comprising the expanded carbon bed (FIG. 1).

The Treatment Reactor:

Specifically, the treatment can be performed within a treatment reactor as described in patent FR2874913.

Bringing the water into contact with the granular activated carbon makes it possible to eliminate organic micropollutants of natural or synthetic origin, such as residues of agrochemical products, pesticides, pharmaceutical molecules, by adsorption of the micropollutants onto the particles of granular activated carbon.

Typically, the treatment is performed in a treatment reactor (1) with an expanded bed of granular activated carbon operating in upward flow and comprising two separate functional areas:
- a reaction zone (A) in the lower part of the reactor composed of an expanded bed of activated carbon ensuring the elimination of the organic micropollutants by adsorption of the latter onto the particles of granular activated carbon; and
- a separation zone (B) in the top part of the reactor ensuring the separation and collection of decontaminated water.

Such a reactor is represented in FIG. 1.

Advantageously, the reactor also comprises an equipped zone (C) located under the reaction zone ensuring the admission and homogenous distribution of the water to be treated. A water distribution manifold (2) is present in the equipped zone.

Typically, the equipped zone contains a blocking bed, such as a bed of gravel surmounted by a bed of sand. The blocking bed makes it possible to avoid the granular activated carbon entering into the distribution manifold. Moreover, the blocking bed makes it possible to ensure a homogenous distribution of the water at the bottom of the reactor and makes it possible to ensure a homogenous suspension of the activated carbon bed within the reaction zone, thus avoiding any zone of still water in the vicinity of the base of the carbon bed. The height of the equipped zone is established according to the overall height space taken up by the distribution manifold and its position in the structure bottom. Specifically, its height can be between 25 and 30 cm above the water inlet.

The distribution manifold is chosen and arranged in such a way as to distribute the water homogenously at the base of the reactor. A good distribution of the water can specifically be obtained when the distribution manifold is a distributor on which are disposed sets of laterals which are equidistant and drilled with openings at identical intervals, preferably directed downward in an alternating staggered arrangement. The distribution manifold is generally sunk in a gravel bed.

When the reactor is operational, the flow rate of water injected into the lower part of the reactor through the distribution manifold makes it possible to start the suspension (or expansion) and maintain the suspension of the granular activated carbon. Within the activated carbon bed, in particular in its lower part, the concentration of activated carbon can reach several hundred grams per liter and effectively exert a decontaminating action, without giving rise to clogging, or pressure drops, as it can be the case with the use of systems with fixed beds of activated carbon. Generally, the average concentration of activated carbon within the expanded bed is of 100 to 450 g/l. It is generally less than or equal to 2 mg/l in the upper part of the separation zone. The height of the separation zone (B) typically varies from 0.5 m to 2.0 m. It is generally close to 1.5 m. Moreover, no treatment additive other than carbon, such as coagulating or flocculating agents to weigh down the carbon particles, needs to be added in the method according to the present invention. However, in certain embodiments, coagulating or flocculating agents can be added upstream of the reactor in the waste water in order to improve the efficiency of the reduction of organic materials and organic micropollutants.

Typically, the height of the expanded bed of granular activated carbon of the reaction zone is between 1 and 2 m, advantageously 1.5 m.

The particle size of the granular activated carbon and the upward velocity of the water are chosen in such a way as to obtain a suspension of activated carbon in the form of an expanded bed, surmounted by a decontaminated water height corresponding to the separation zone. The term "upward velocity" refers to the ratio of the hydraulic flow rate of the water injected into the reactor over the ground surface of the treatment reactor.

Advantageously, the particle size of the granular activated carbon is between 100 and 1000 µm, more advantageously between 300 and 800 µm, yet more advantageously between 600 and 800 µm. Advantageously, several types of activated carbon of different particle sizes or densities can be used in the same reactor (FIG. 8). The present invention thus makes it possible to treat a wide variety of micropollutants present in water with degrees of adsorbability that vary with the carbon used.

In a particular embodiment of the present invention the particle size of the granular activated carbon is between 300 and 1000 µm, more advantageously between 600 and 800 µm, and/or the upward velocity of the water varies from 7 to 20 $m^3/m^2 \cdot h$, more advantageously from 12 to 15 $m^3/m^2 \cdot h$ The time of contact of the water with the activated carbon is defined as a function of the upward velocity of the water and the height of the expanded carbon bed. The contact time generally varies from 5 to 60 min, advantageously from 5 to 30 min, yet more advantageously from 8 to 15 min.

Advantageously according to the present invention, the choice of a particular carbon particle size associated with the choice of a particular upward velocity of the water allow a gravitational separation of the carbon particles from the decontaminated water with the obtainment of the decontaminated and settled water in the upper part of the reactor, with a very low residual activated carbon content.

In a particular embodiment, the injection of new granular activated carbon into the reactor is typically performed above the carbon bed (in expansion), preferably by one or more injection systems (3) typically composed of a pipe of a section between 100 and 200 mm according to the qualities of the granular activated carbon to be introduced.

Advantageously, the injection of new granular activated carbon is performed using a water ejector which makes it possible to bring the activated carbon into the upper part of the reactor (separation zone (B)). The injection system(s) (3), particularly one or more injection rod(s), are placed parallel to the walls of the reactor and end in a bend at 45° which is always located above the activated carbon bed in expansion. Typically, the bend is located between 1.5 and 2 m below the level of discharge of the treatment water (draw-off channels (5)). Typically, the end of this (or these) injection pipe(s) is (are) such as to form a bevel that will facilitate the flow of activated carbon toward the surface of the bed of this activated carbon. The advantage of this system lies in the fact that clogging of this equipment is difficult, or even impossible.

The expression "new activated carbon" refers, contrary to the expression "used or expanded activated carbon", to carbon that has not yet been put into contact with these organic micropollutants.

The decontaminated and settled water can be collected by overflow in the upper part of the reactor. The draw-off channels (5) are disposed in the top part of the reactor. The treatment reactor with upward flow and expanded bed can furthermore comprise means for recirculating decontaminated water inside the reactor, in order to keep a sufficient velocity of expansion or fluidization allowing a minimum expansion of the carbon bed to avoid the reactor being damaged during the production stoppage phases.

According to the invention, the granular activated carbon can be regenerable or reactivatable carbon. The used granular activated carbon is then extracted then stored before being sent to centers for reactivation or regeneration by an essentially thermal route.

Advantageously, the decontamination method according to the invention is suitable for waste water and water to be treated to potable quality, yet more advantageously to waste water.

EXAMPLES

By way of a simple illustration there appear below two particular examples of treatment of water according to the method of the present invention, in a treatment reactor as described in the present application (FIG. 1), in relation to FIGS. 1, 2, 3, 4, 5 and 6. The particular conditions stated below have led to particularly satisfactory results in the context of this invention.

Example 1

Reactor Initially Empty

1) Fixed percentage of reduction of micropollutants contained in the waste water: 70-80%;

2) Determination of the rate (Tx) of treatment with granular activated carbon to be injected into the reactor using the relationships % MP=f (% UV) (FIG. 2); % MP=f(Tx) (FIG. 3) and % UV=f(Tx) (FIG. 4). According to the curves obtained, the percentage of reduction of micropollutants of 70-80% corresponds to a UV reduction percentage of approximately 30% and is obtained with a rate of treatment with granular activated carbon 20 g/m$^3$;

3) Daily injection of 20 g/m$^3$ (corresponding to 120 g in the case of this installation) of granular activated carbon into an initially empty treatment reactor above the activated carbon bed in the upper part of the reactor by way of an injection rod;

4) Daily check of the reduction yield $UV_c$ (% $UV_c$). The graph in FIG. 5 shows the variation of % $UV_c$ over time (i.e. as a function of the masses of granular activated carbon injected daily);

5) Using the graph in FIG. 5, a stabilization in the reduction yield $UV_c$ was observed, i.e. % $UV_c$=30%±20% of (30) i.e. % $UV_c$ between 24 and 36%, during at least 5 days counting from the 40$^{th}$ day. The mass or volume of granular activated carbon in the reactor is then considered optimal, an extraction of activated carbon is then performed once a week from two extraction levels of the activated carbon bed (a first level is located in the upper part of the carbon bed, the second level is meanwhile located in the lower part), the mass or volume of carbon extracted corresponding to the mass or volume of activated carbon introduced between two extractions.

Example 2

Reactor Comprising an Initial Load of Activated Carbon

1') Set percentage of reduction of micropollutants contained in the waste water: 55%;

2') Determination of the rate (Tx) of treatment with granular activated carbon to be injected into the reactor using the relationships % MP=f (% UV) (FIG. 2); % MP=f(Tx) (FIG. 3) and % UV=f(Tx) (FIG. 4). According to the curves obtained, the percentage of reduction of micropollutants of 55% corresponds to a UV reduction percentage of approximately 20% and is obtained with a rate of treatment with granular activated carbon 15 g/m$^3$;

3') In the event of a start in which the removal yield must be immediately ensured, an initial load of granular activated carbon of 2.3 kg (corresponding to a carbon bed height of 28 cm) is introduced into the reactor before it is started up;

4') Daily check of the reduction yield $UV_c$ (% $UV_c$). The graph in FIG. 6 shows the variation of % $UV_c$ over time;

5) On the 5$^{th}$ day, when % $UV_c$ is such that % $UV_c$=25% i.e.: 20≤% $UV_c$≤35% (% $UV_f$≤% $UV_c$≤% $UV_f$+15%), daily injection of 15 g/m$^3$ (corresponding to 90 g in the case of this installation);

6) Still using the graph in FIG. 6, a daily check is made of the reduction yield $UV_c$ until a stabilization of the reduction yield $UV_c$ is observed, i.e. when % $UV_c$=20%±20% of (20), i.e. % $UV_c$ between 16 and 24%, during at least 5 days. This stabilization is observed from the 25$^{th}$ day. The mass or volume of granular activated carbon in the reactor is then considered optimal, an extraction of activated carbon is then performed once a week from two extraction levels of the activated carbon bed (a first level is located in the upper part of the carbon bed, the second level meanwhile is located in the lower part), the mass or volume of carbon extracted corresponding to the mass or volume of activated carbon introduced between two extractions.

Figure 7:
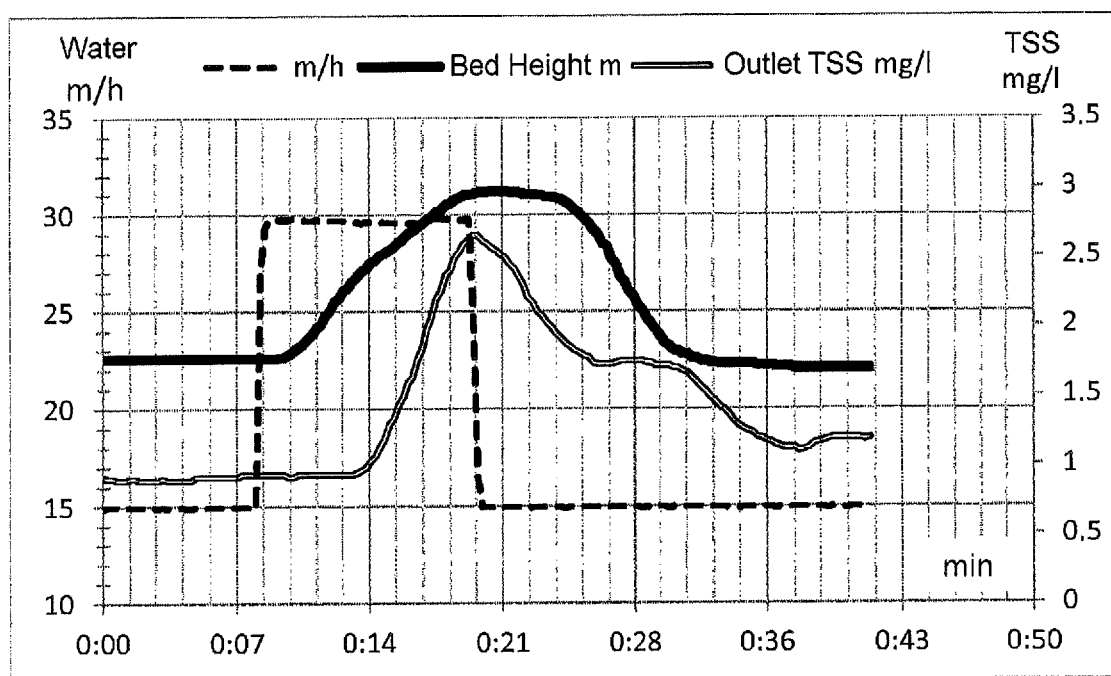
FIG. 7 is a graph representing the upward velocity, the variation of the activated carbon bed height and the TSS at the treatment reactor outlet during washing.

By way of a simple illustration there appears below a particular example of the step of washing the activated carbon bed according to the method of the present invention, in relation to FIG. 7.

Example 3

The treatment reactor according to the present invention is an upward-flow treatment reactor, so as the water to be treated contains TSS, as in most cases, an accumulation of these TSS occurs. A wash comprising the following phases is then carried out:

1) Expansion phase: increase in the upward expansion velocity of the granular activated carbon by the starting of the recirculation pump as a supplement to the supply flow rate. During the wash, the expansion velocity goes from 15 m$^2$/m$^3$·h to 30 m$^2$/m$^3$·h. This desired velocity allows a necessary and sufficient expansion to extract the TSS from the activated carbon bed.

2) Settling phase: the stopping of the phase of expansion of the granular activated carbon corresponding to the start of the settling phase is determined when the concentration of TSS at the channels increases by a few mg/l (the concentration of TSS goes from 1 to 2.5 g/L in 7 minutes (FIG. 7)), the TSS concentration being measured by a TSS sensor (Solitax from LANGE).

3) Drainage phase: the valve located at the drainage height ($h_v$) is open for a duration of 5 minutes to discharge the water column comprising the TSS corresponding to the zone (B) (FIG. 1) toward the pretreatment station.

4) Rinsing phase: resumption of the supply by injection of water into the lower part of the treatment reactor at an upward velocity of: 15 m$^2$/m$^3$·h for a duration of 10 minutes, the drain valve being open.

The invention claimed is:

1. A method for decontaminating water containing organic micropollutants, in such a way as to reduce a previously—set percentage of micropollutants, comprising:

setting a percentage of micropollutants for reduction;
conducting adsorption of the organic micropollutants onto granular activated carbon in a treatment reactor with upward flow, wherein the conducting adsorption comprises: (i) injecting water into a lower part of the treatment reactor containing a bed of the granular activated carbon in such a way as to create an expansion of said granular activated carbon, (ii) simultaneously performing gravitational separation of decontaminated water from the activated carbon particles, and (iii) retrieving by overflow the decontaminated water settled in an upper part of the reactor; and
reducing the previously—set percentage of micropollutants, wherein the reducing comprises:
determining a UV reduction yield (% $UV_f$) on the basis of said previously—set percentage of reduction of micropollutants (% $MP_f$) using a relationship % MP=f (% UV),
determining a rate (Tx) of treatment with granular activated carbon to be injected into the reactor using the relationships % MP=f(Tx) and/or % UV=f(Tx), and
checking by UV of the performance of the treatment by adsorption onto granular activated carbon at the previously defined treatment rate (Tx), the checking comprising:
1) measuring the absorbency at a given wavelength λ of the water before treatment by adsorption onto granular activated carbon ($A_{\lambda AvTx}$);
2) measuring the absorbency at the same wavelength λ of the water after treatment by adsorption onto granular activated carbon ($A_{\lambda ApTx}$); and
3) calculating the UV reduction yield (% $UV_c$) on the basis of the absorbencies measured before and after treatment (% $UV_c = ((A_{\lambda AvTx} - A_{\lambda ApTx})/A_{\lambda AvTx})*100$), determining a volume of granular activated carbon that is necessary and sufficient in the reactor to obtain said % $UV_f$ wherein the determining comprises:
a) daily injecting granular activated carbon at the previously defined treatment rate (Tx) into the initially empty treatment reactor, then
b) checking the reduction yield $UV_c$(% $UV_c$), and
c) obtaining the volume of granular activated carbon that is necessary and sufficient when said % $UV_c$ is such that: % $UV_c$=% $UV_f$±20% (% $UV_f$) for at least 5 days, and
d) extracting the granular activated carbon expanded in such a way as to preserve said necessary and sufficient volume of granular activated carbon in the reactor;
wherein said relationship % MP=f (% UV) is determined as follows:
(i) taking samples of said water;
(ii) selecting one or more organic micropollutants to be quantified in said samples;
(iii) measuring a concentration of the organic micropollutants selected in step (ii) in said samples and measuring the absorbency of said samples at a given wavelength λ;
(iv) treating said samples by putting them in contact with increasing doses of granular activated carbon;
(v) measuring, for each dose of activated carbon tested, a concentration of the organic micropollutant(s) selected in step (ii) in said samples after treatment as per step (iv);
(vi) measuring, for each dose of activated carbon tested, the absorbency of said samples after treatment as per step (iv) at a given wavelength λ;

(vii) determining, for each dose of activated carbon tested, the percentage of reduction of micropollutants (% MP) and/or the UV reduction yield (% UV) to thus obtain the relationships % MP=f(Tx) and % UV=f(Tx);
(viii) determining the equation of the relationship % MP=f (% UV), expressing the percentage of reduction of micropollutants (% MP) as a function of the UV reduction yield (% UV).

2. The decontamination method according to claim 1, wherein the relationships % MP=f(Tx) and % UV=f(Tx) are obtained from steps (i) to (vii).

3. The decontamination method according to claim 1, wherein said injection of water is performed at an upward velocity between 7 and 20 $m^3/m^2 \cdot h$, in such a way as to obtain a dense suspension of expanded activated carbon in the form of an expanded bed, surmounted by a height of settled clear water.

4. The decontamination method according to claim 1, wherein said extraction of expanded granular activated carbon is performed from at least two extraction levels of the activated carbon bed.

5. The decontamination method according to claim 1, wherein said absorbency measurements of the water are performed at a wavelength λ between 200 and 300 nm.

6. The decontamination method according to claim 1, wherein a particle size of the granular activated carbon is between 300 and 800 μm.

7. The decontamination method according to claim 1, wherein the daily injection of granular activated carbon into the reactor is performed above the activated carbon bed in the upper part of the reactor.

8. The decontamination method according to claim 1, comprising at least one step of washing the activated carbon bed.

9. The decontamination method according to claim 8, wherein said washing is performed when $h_e \geq h_p$+10 to 50% ($h_p$), $h_e$ representing the height of the unwashed expanded bed and $h_p$ the height of the washed bed.

10. The decontamination method according to claim 8, wherein said washing step comprises an expansion phase and a settling phase, said expansion phase consisting in applying to the activated carbon bed an upward expansion velocity of 20 to 50 $m^3/m^2 \cdot h$, allowing the separation of the granular activated carbon from the total suspended solids present in the water.

11. The decontamination method according to claim 8, wherein the duration of said expansion phase is between 5 and 15 minutes.

12. The decontamination method according to claim 3, wherein said injection of water is performed at an upward velocity between 12 and 15 $m^3/m^2h$, in such a way as to obtain a dense suspension of expanded activated carbon in the form of an expanded bed, surmounted by a height of settled clear water.

13. The decontamination method according to claim 5 wherein that said absorbency measurements of the water are performed at a wavelength λ of 254 nm.

14. The decontamination method according to claim 6, wherein the particle size of the granular activated carbon is between 600 and 800 μm.

15. The decontamination method according to claim 9, wherein said washing is performed when $h_e \geq h_p$+10 to 20% ($h_p$), $h_e$ representing the height of the unwashed expanded bed and $h_p$ the height of the washed bed.

16. The method for decontaminating water according to claim 1, wherein said water is waste water.

17. A method for decontaminating water containing organic micropollutants, in such a way as to reduce a previously—set percentage of micropollutants, comprising:
setting a percentage of micropollutants for reduction;
conducting adsorption of the organic micropollutants onto granular activated carbon in a treatment reactor with upward flow, wherein the conducting adsorption comprises: (i) injecting water into a lower part of the treatment reactor containing a bed of the granular activated carbon in such a way as to create an expansion of said activated carbon, (ii) simultaneously performing gravitational separation of decontaminated water from the activated carbon particles, and (iii) retrieving by overflow the decontaminated water settled in an upper part of the reactor; and
reducing a previously-set percentage of micropollutants, wherein the reducing comprises:
determining a UV reduction yield (% $UV_f$) on the basis of said previously—set percentage of reduction of micropollutants (% $MP_f$) using a relationship % MP=f (% UV),
determining a rate (Tx) of treatment with granular activated carbon to be injected into the reactor using the relationships % MP=f(Tx) and/or % UV=f(Tx), and
checking by UV the performance of the treatment by adsorption onto granular activated carbon at the previously defined treatment rate (Tx), the checking comprising:
1) measuring the absorbency at a given wavelength $\lambda$ of the water before treatment by adsorption onto granular activated carbon ($A_{\lambda AvTx}$);
2) measuring the absorbency at the same wavelength $\lambda$ of the water after treatment by adsorption onto granular activated carbon ($A_{\lambda ApTx}$); and
3) calculating the UV reduction yield (% $UV_c$) on the basis of the absorbencies measured before and after treatment (% $UV_c=((A_{\lambda AvTx}-A_{\lambda ApTx})/A_{\lambda AvTx})*100$)
determining a volume of granular activated carbon necessary and sufficient in the reactor to obtain said previously—set % $UV_f$ wherein the determining comprises:
a') prior to the starting of the treatment reactor, introducing an initial load of granular activated carbon into the reactor, said load accounting for a carbon bed height between 20 and 50 cm, and said load being chosen in such a way as to obtain at least the previously—set percentage of reduction of micropollutants (% $MP_f$), then
b') checking the reduction yield $UV_c$(% $UV_c$),
c') when said % $UV_c$ is such that: % $UV_f \leq$ % $UV_c \leq$ % $UV_f$+15%, daily injecting granular activated carbon into the reactor,
d') checking the reduction yield $UV_c$(% $UV_c$) until obtainment of the necessary and sufficient volume of granular activated carbon when said % $UV_c$ is such that: % $UV_c$=% $UV_f \pm 20$% (% $UV_f$) for at least 5 days, and
e') extracting granular activated carbon expanded in such a manner as to preserve said necessary and sufficient volume of granular activated carbon in the reactor;
wherein said relationship % MP=f (% UV) is determined as follows:
(i) taking samples of said water;
(ii) selecting one or more organic micropollutants to be quantified in said samples;
(iii) measuring a concentration of the organic micropollutants selected in step (ii) in said samples and measuring the absorbency of said samples at a given wavelength $\lambda$;
(iv) treating said samples by putting them in contact with increasing doses of granular activated carbon;
(v) measuring, for each dose of activated carbon tested, a concentration of the organic micropollutant(s) selected in step (ii) in said samples after treatment as per step (iv);
(vi) measuring, for each dose of activated carbon tested, the absorbency of said samples after treatment as per step (iv) at a given wavelength $\lambda$;
(vii) determining, for each dose of activated carbon tested, the percentage of reduction of micropollutants (% MP) and/or the UV reduction yield (% UV) to thus obtain the relationships % MP=f(Tx) and % UV=f(Tx);
(viii) determining the equation of the relationship % MP=f (% UV), expressing the percentage of reduction of micropollutants (% MP) as a function of the UV reduction yield (% UV).

* * * * *